(12) United States Patent
Fujimoto

(10) Patent No.: US 8,489,802 B2
(45) Date of Patent: Jul. 16, 2013

(54) RECORDABLE MEMORY DEVICE WHICH WRITES DATA TO REFORMATTED USER AREA OF NONVOLATILE SEMICONDUCTOR MEMORY

(75) Inventor: Akihisa Fujimoto, Yamato (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 660 days.

(21) Appl. No.: 12/562,380

(22) Filed: Sep. 18, 2009

(65) Prior Publication Data

US 2010/0125698 A1 May 20, 2010

(30) Foreign Application Priority Data

Nov. 19, 2008 (JP) ................. 2008-295843

(51) Int. Cl.
*G06F 12/00* (2006.01)
(52) U.S. Cl.
USPC .... 711/103; 711/200; 711/201; 711/E12.001; 711/E12.008
(58) Field of Classification Search
USPC ........... 711/103, 200–201, E12.001, E12.008
See application file for complete search history.

(56) References Cited

U.S. PATENT DOCUMENTS 6,725,322 B1 * 4/2004 Shiraishi et al. ............... 711/103
2009/0016181 A1 * 1/2009 Nakamura et al. ......... 369/47.14

FOREIGN PATENT DOCUMENTS

JP 2001-51883 2/2001
JP 2004-326165 11/2004

OTHER PUBLICATIONS

U.S. Appl. No. 13/050,565, filed Mar. 17, 2011, Fujimoto.
U.S. Appl. No. 13/052,147, filed Mar. 21, 2011, Fujimoto.
Office Action issued Mar. 25, 2011 in Korea Application No. 10-2009-111404 (With English Translation).
Yi Seokho, "Data Configuration and C", Jeong-lk Press, Jan. 15, 2004, pp. 207-209.

* cited by examiner

*Primary Examiner* — Jasmine Song
(74) *Attorney, Agent, or Firm* — Oblon, Spivak, McClelland, Maier & Neustadt, L.L.P.

(57) ABSTRACT

A recordable memory device includes a nonvolatile semiconductor memory, and a controller controlling the nonvolatile semiconductor memory based on a recordable system. The nonvolatile semiconductor memory has a user area capable of directly making an access from a host, and a system area managed by the controller. A data writing to the reformatted user area of the nonvolatile semiconductor memory executes from a start point which is an unused area after the final physical address of old recordable data recorded in the user area before the reformat. The data writing executes from a start point which is a top physical address in the user area, when the start point exceeds the final physical address in the user area.

9 Claims, 9 Drawing Sheets

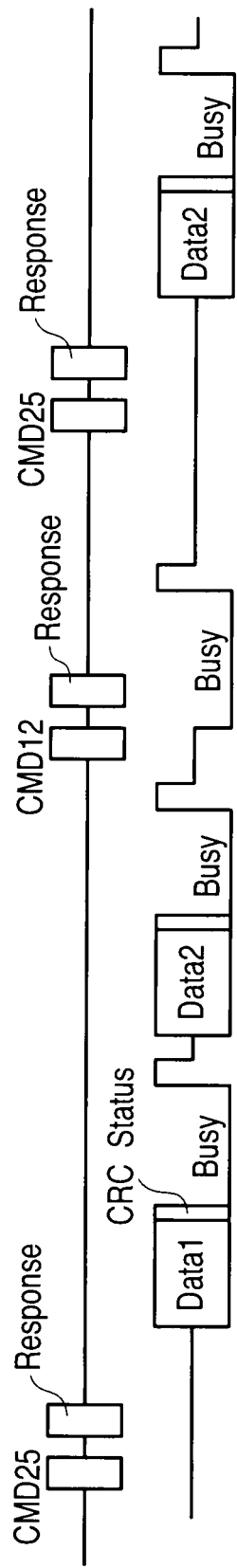
F I G. 2

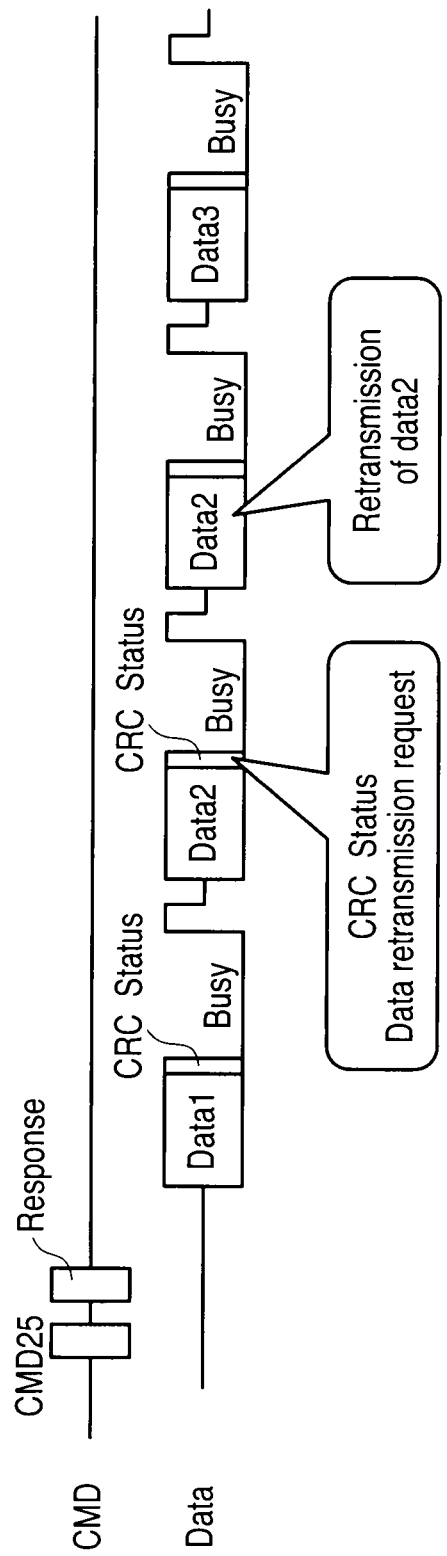
F I G. 3

Initial format state

| Physical address | Recorded data | Extra data Flag | Address |
|---|---|---|---|
| 0 | Free | 0 | |
| 1 | Free | 0 | |
| 2 | Free | 0 | |
| 3 | Free | 0 | |
| 4 | Free | 0 | |
| 5 | Free | 0 | |
| 6 | Free | 0 | |
| ⋮ | ⋮ | ⋮ | |
| S-2 | Free | 0 | |
| S-1 | Free | 0 | |
| S | Free | 0 | |
| S+1 | Free | 0 | |
| S+2 | Free | 0 | |
| ⋮ | ⋮ | ⋮ | |
| | System | 0 | |

UA: rows 0 through S-1
RA: rows S through S+2...
SA: System row

State of writing recordable data Data1-DataN from initial format state

| Physical address | Recorded data | Extra data Flag | Extra data Address |
|---|---|---|---|
| 0 | Data1 | 0 | |
| 1 | Data2 | 0 | |
| 2 | Error | 1 | S |
| 3 | Data4 | 0 | |
| ... | ... | ... | |
| N-1 | DataN | 0 | |
| N | Free | 0 | |
| N+1 | Free | 0 | |
| N+2 | Free | 0 | |
| ... | ... | ... | |
| S-1 | Free | 0 | |
| S | Data3 | 0 | 2 |
| S+1 | Free | 0 | |
| S+2 | Free | 0 | |
| ... | ... | ... | |
| | System | 0 | |

OS1="0", OS2="0",
⇨ OS1="+N" OS2="-(S-N)"

Reformat state

| Physical address | Recorded data | Extra data Flag | Address |
|---|---|---|---|
| 0 | Free | 0 | |
| 1 | Free | 0 | |
| 2 | Free | 1 | |
| 3 | Free | 0 | |
| ⋮ | ⋮ | ⋮ | |
| N-1 | Free | 0 | |
| N | Free | 0 | |
| N+1 | Free | 0 | |
| N+2 | Free | 0 | |
| ⋮ | ⋮ | ⋮ | |
| S-1 | Free | 0 | |
| S | Free | 0 | |
| S+1 | Free | 0 | |
| S+2 | Free | 0 | |
| ⋮ | ⋮ | ⋮ | |
| | System | 0 | |

UA: 0 to S-1
RA: S to S+2
SA: System

FIG. 6

RECORDABLE MEMORY DEVICE WHICH WRITES DATA TO REFORMATTED USER AREA OF NONVOLATILE SEMICONDUCTOR MEMORY

CROSS-REFERENCE TO RELATED APPLICATIONS

This application is based upon and claims the benefit of priority from prior Japanese Patent Application No. 2008-295843, filed Nov. 19, 2008, the entire contents of which are incorporated herein by reference.

BACKGROUND OF THE INVENTION

1. Field of the Invention

The present invention relates to a write control for a recordable memory device.

2. Description of the Related Art

Size reduction of video recorders has made it necessary to record image data in a nonvolatile recording medium such as a memory card in real time. Recently, high quality of a video image has been realized. And so a stable write performance at a bit rate of about 4 MB/s for the video recorders has been required, simultaneously.

However, if memory data is managed using a file allocation table (FAT) file system, fragmentation of data occurs while a write or erase operation is repeated. As frequent occurrence of this fragmentation is a factor of remarkably reducing memory performance, it is difficult to perform the real-time recording.

In case of a NAND flash memory, write to a NAND block having fragmentation needs, in addition to real-time recording, that data already recorded in the NAND block must be newly recorded in another NAND block. Accordingly, overhead of write time occurs and the memory performance is reduced.

According to conventional real-time recording, if an error occurs, data transfer between a host apparatus and a memory card is temporarily stopped, and thereafter, retry must be done. Thus, write efficiency is reduced (e.g., see Jpn. Pat. Appln. KOKAI Publication No. 2004-326165).

During the retry, as real-time recording is not carried out, there is the possibility that data is lost.

Specifically, read/write of a memory card is controlled based on a command system of a random access memory. If an error occurs during real-time recording, the memory card gives an error notification to the host apparatus. When receiving the error notification, the host apparatus stops data transfer and then executes retry. Thus, image data obtained during the retry is not recorded in real time.

Considering the foregoing circumstances, it is desired to develop a technique capable of performing real-time recording at a stable write performance.

BRIEF SUMMARY OF THE INVENTION

A recordable memory device according to an aspect of the present invention comprises a nonvolatile semiconductor memory, and a controller controlling the nonvolatile semiconductor memory based on a recordable system. The nonvolatile semiconductor memory has a user area capable of directly making an access from a host, and a system area managed by the controller. A data writing to the reformatted user area of the nonvolatile semiconductor memory executes from a start point which is an unused area after the final physical address of old recordable data recorded in the user area before the reformat. The data writing executes from a start point which is a top physical address in the user area, when the start point exceeds the final physical address in the user area.

BRIEF DESCRIPTION OF THE SEVERAL VIEWS OF THE DRAWING

FIGS. 2 and 3 are waveform charts, each showing an error handling;
FIG. 4 is a view showing an initial format state;
FIG. 5 is a view showing a writing operation in an initial format state;
FIG. 6 is a view showing a reformat state.

DETAILED DESCRIPTION OF THE INVENTION

Figure 1:
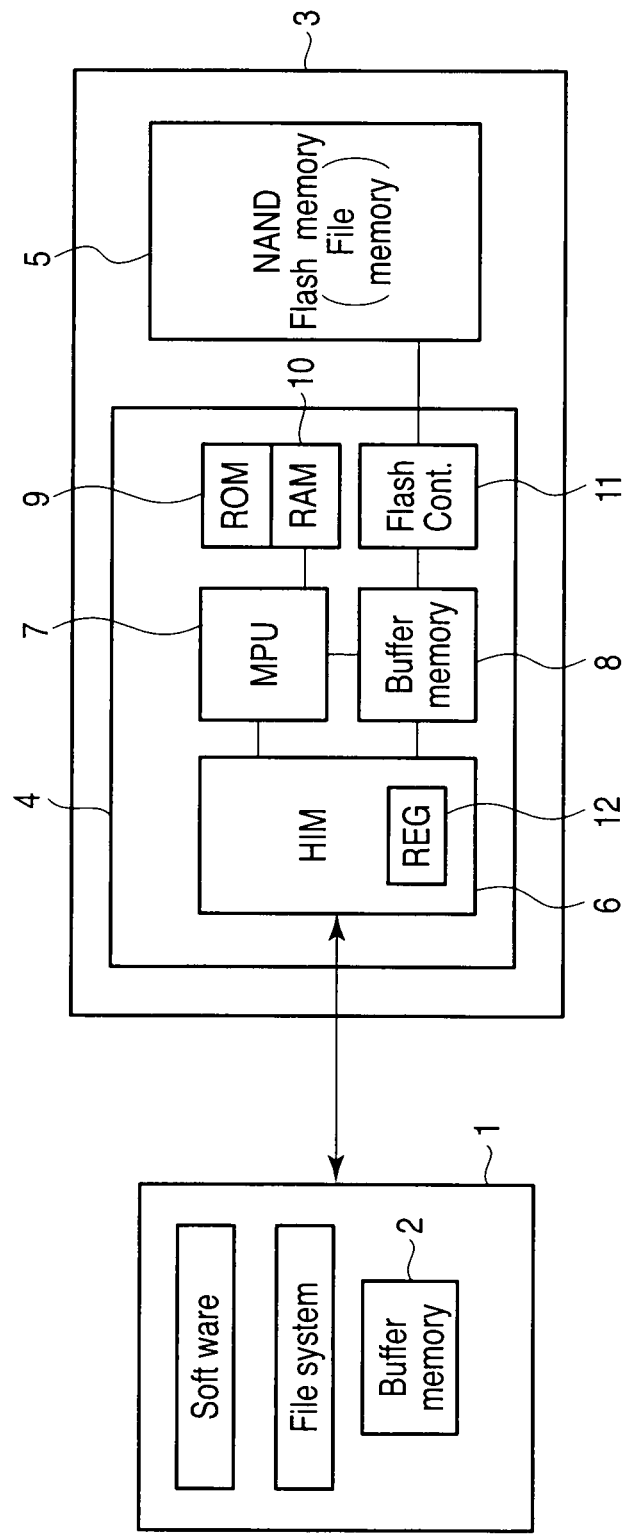
FIG. 1 is a view showing a memory system.

A recordable memory device of an aspect of the present invention will be described below in detail with reference to the accompanying drawings.

1. Outline

A memory device according to an aspect of the present invention is an intelligent memory device having a controller. For example, the memory device is a recordable memory card and a recordable memory device, which use a nonvolatile semiconductor memory such as a flash memory as a file memory, and writes data from a lower address to a higher address.

In general, as a recordable media such as CD-R, CD-RW, DVD-R and DVD-RW has no controller, error handling by a universal disk format (UDF) file system is required. However, when an error is detected in the intelligent memory device, error handling is carried out by a controller of the intelligent memory device not by a file system.

For example, a memory card having a flash memory does not give an error notification to the host apparatus with respect to a recoverable error produced in a write operation and a controller performs error handling. Thus, load on the file system is reduced and error handling in the write operation is efficiently performed.

According to recordable writing, data is continuously writable without being divided. Therefore, data transfer is controlled by hardware such as a direct memory access (DMA) controller, and thereby, high-efficiency data transfer and a stable write performance are realizable. When a data retransmission request is made with respect to a cyclic redundancy check (CRC) error, it is possible to avoid temporary stoppage of data transfer.

When a write error occurs, if alternative handling by an address conversion table is carried out, the chip cost becomes high. Because of the conversion table is a large size. Conversely, if the address conversion table is made small size, load on the controller increases.

In order to solve the foregoing problem, in the memory device according to an aspect of the present invention, data writing to the reformatted user area of the nonvolatile semiconductor memory is carried out in order from a physical address next to the final physical address of old recordable data recorded in the user area before reformat.

However, if the final physical address of the old recordable data is the final physical address of the user area, data writing is carried out in order from a top physical address of the user area.

If new recordable data reaches the final physical address of the user area, data writing is carried out in order from a top physical address of the user area following the foregoing address.

As described above, in the user area, a physical address is rotated every real-time recording. In this way, the memory is uniformly used, and thereby, generation of a defective address (e.g., bad block) is prevented, and the address conversion table is dispensed with.

In other words, the address conversion table is applied to the system area only. Therefore, it is possible to reduce the chip cost without increasing a load on the controller.

2. Embodiment (1) System Configuration

FIG. 1 shows the configuration of a system to which a memory device according to embodiments of the present invention is applied.

A host apparatus 1 has a buffer memory 2, which temporarily records write data. The host apparatus 1 controls a file system based on software (e.g., programs recorded in a ROM).

A memory device (e.g., memory card) 3 includes a controller 4 and a flash memory (e.g., NAND-flash memory) 5 used as a file memory.

The controller 4 has a host interface module (HIM) 6, a microprocessor unit (MPU) 7, a buffer memory 8, a read only memory (ROM) 9, a random access memory (RAM) 10 and an access controller (flash cont.) 11. The host interface module 6 has a register (REG) 12.

The host interface module 6 interprets a command transferred from the host apparatus 1 to manage a bus protocol. The microprocessor unit 7 executes processing designated by a command. The buffer memory 8 temporarily records write data in the flash memory 5.

The ROM 9 records program data, and the RAM 10 temporarily records data processed by the microprocessor unit 7.

The access controller 11 controls an access to the flash memory 5 in read/write operations.

The register 12 built in the host interface module 6 temporarily records information of the memory device 3 transferred to the host apparatus 1.

When a recoverable error such as a CRC error occurs in a write operation, the controller 4 executes error handling. The controller 4 executes error handling, and thereby, load on the file system is reduced and temporary stoppage of data transfer is prevented.

In the system, the controller 4 includes elements other than elements disclosed in FIG. 1.

The file memory may be a resistive RAM (ReRAM), magnetic RAM (MRAM) or phase change RAM (PRAM), in place of the flash memory 5.

(2) First Embodiment

A system is as shown in FIG. 1.

According to the first embodiment, in the memory device 3, write data transmitted from the host apparatus 1 is temporarily stored in the buffer memory 8. If data is not correctly stored in the buffer memory 8, for example, if a CRC error occurs, a data retransmission request is made at a command level to acquire correct data again.

In other words, the memory device 3 gives a data retransmission request notification to the host apparatus 1, and thereby, error handling is executed without stopping data transfer.

If data is correctly stored in the buffer memory 8, the access controller 11 gives write instructions to the flash memory 5. If a write error occurs in the flash memory 5, retry is executed using data stored in the buffer memory 8. Therefore, there is no need to make a data retransmission request in this case.

However, if retry is not executed, there is a need of giving an error notification to the host apparatus 1 to temporarily stop data transfer. In this case, the probability is very low.

According to the first embodiment, a CRC error is mainly given as a target. The CRC error means illegal data resulting from external factors such as noise. In an interface protocol between the host apparatus 1 and the memory device 3, a sender embeds a correlated CRC code in data while a receiver validates the CRC code. In this way, it is possible to determine whether or not an error exists in the received data.

FIG. 2 shows general error handling.

If an error occurs during the transfer of Data2 from the host apparatus to the memory device, an error notification is given to the host apparatus by a CRC status. The host apparatus issues a CMD (command) 12 to temporarily stop data transfer. For example, if write of Data2 is not completed, write (retry) of Data2 is again executed.

FIG. 3 shows error handling according to the first embodiment.

If an error occurs during the transfer of Data2 from the host apparatus to the memory device, error and data retransmission request notifications are given to the host apparatus by a CRC status. When recognizing the data retransmission request, the host apparatus directly retransmits Data2. If write of Data2 succeeds, the host apparatus continuously transfers Data3.

The foregoing data retransmission function requires compatibility between the host apparatus 1 and the memory device shown in FIG. 1.

For example, the register 12 shown in FIG. 1 has a retransmission status showing the presence of a data retransmission function, and a retransmission flag for declaring valid/invalid the data retransmission function. In this case, the retransmission flag may be recorded in a memory of the memory device 3 except the register 12.

The system is composed of a memory device having a data retransmission function and a data retransmission function enable host apparatus. As the system is configured in this manner, for example, the host apparatus can determine a retransmission status in initialization and can previously set a retransmission flag.

If the data retransmission function is valid, it is determined that the host apparatus continuously transmits the same data even if the controller of the memory device detects a CRC error. Therefore, write to the buffer memory 8 and the flash memory 5 is carried out. However, if the CRC error continuously occurs in the same data, the host apparatus stops data retransmission.

Conversely, if the data retransmission function is invalid, when the controller of the memory device detects a CRC error, the controller gives notification of CRC error detection only to the host apparatus, and then, stops a write operation.

(3) Second Embodiment

A system is as shown in FIG. 1.

According to the second embodiment, in the memory device 3, when write data is correctly recorded in a specified address of the memory area, an occurrence of an error is recorded in an alternative flag corresponding to the specified address. Further, the specified address and the write data are recorded in an alternative area.

In this case, error handling is carried out in the controller 4, and notification of the occurrence of error is not given to the host apparatus 1. Therefore, load on the file system is reduced, and data transfer is not stopped when the foregoing recoverable error occurs.

The second embodiment is applied to a memory device, which is formatted by a recordable file system, and which write data is recorded in a serial address.

FIG. 4 shows an initial format state of a memory.

For example, a physical address corresponds to a block address of one NAND block (erase block), and is expressed by a natural number (including 0). A physical address of a user area UA is 0, 1, 2, 3, 4, 5, 6, . . . , S−2, S−1. A physical address of a system area SA is S, S+1, S+2, . . . .

A recording area corresponding to one physical address is composed of recorded data recording main data and extra data recording extra data.

In the recorded data, "Free" shows a non-recording state, and "System" shows system data. An alternative flag and an alternative address are recorded in the extra data. The foregoing alternative flag and alternative address are given to one erase block one by one. Further, means for searching positions of the alternative flag and the alternative address in the extra data may be additionally provided.

The user area UA is directly accessible from the host based on read/write commands. However, the system area SA is managed by the controller of the memory device, and is an area which is not accessed from the host. An alternative area RA is a part of the system area SA. The capacity of the system area SA is much smaller than that of the user area UA.

According to a memory management method of the recordable memory of an aspect of the present invention, an address conversion table is provided in the system area only. Address mapping rotating using physical address is carried out with respect to the user area as described below. For this reason, the address conversion table is not used. In other words, the address conversion table is applied to the system area only; therefore, this serves to reduce the chip cost.

FIG. 5 shows a state of writing Data 1 to Data N from the initial format state.

For example, when data is written using a multi-block write command from the initial format state, a logical address and a physical address coincide with each other.

In the user area UA, recorded data Data 1 to Data N are recorded in recorded data of physical addresses 0 to N−1 corresponding to logical addresses 0 to N−1.

In this case, Data 1 is written in logical address 0, and Data 2 is written in logical address 1. Thereafter, the case where write of Data 3 to the logical address fails will be described below.

In this case, Data 3 is written in a physical address S of the alternative area RA, and logical address 2 or data showing it is written in an alternative address of the physical address S ("2" is simply shown in FIG. 5). An alternative flag of the physical address 2 is set to "1", and thereby, the physical address 2 is shown as being defective while the physical address S written with Data 3 or data showing it is written ("S" is simply shown in FIG. 5).

The foregoing information is used in a read operation.

Thereafter, Data 4 is written in the logical address, and finally, Data N is written to logical address N−1.

As described above, if the physical address 2 is defective, a general recordable media temporarily stops data transfer. Then, the physical address is skipped so that data is recorded in the next physical address 3. In contrast, according to the second embodiment, data is recorded in the alternative address S without temporarily stopping data transfer.

The number N of logical addresses 0 to N−1 used for recording recorded data Data1 to Data N is smaller than the number S of all logical addresses 0 to S−1 of the user area. In other words, both N and S are a natural number, and have a relationship of N<S.

FIG. 6 shows a reformat state of a memory.

Reformat is executed from the state shown in FIG. 5.

In FIG. 6, symbols and letters are the same as shown in the initial format state of FIG. 4.

The reformat state differs from the initial format state in that an alternative flag corresponding to the defective physical address 2 is set to "1". In other words, information is the defective physical address 2 is defective is succeeded.

Figure 7:
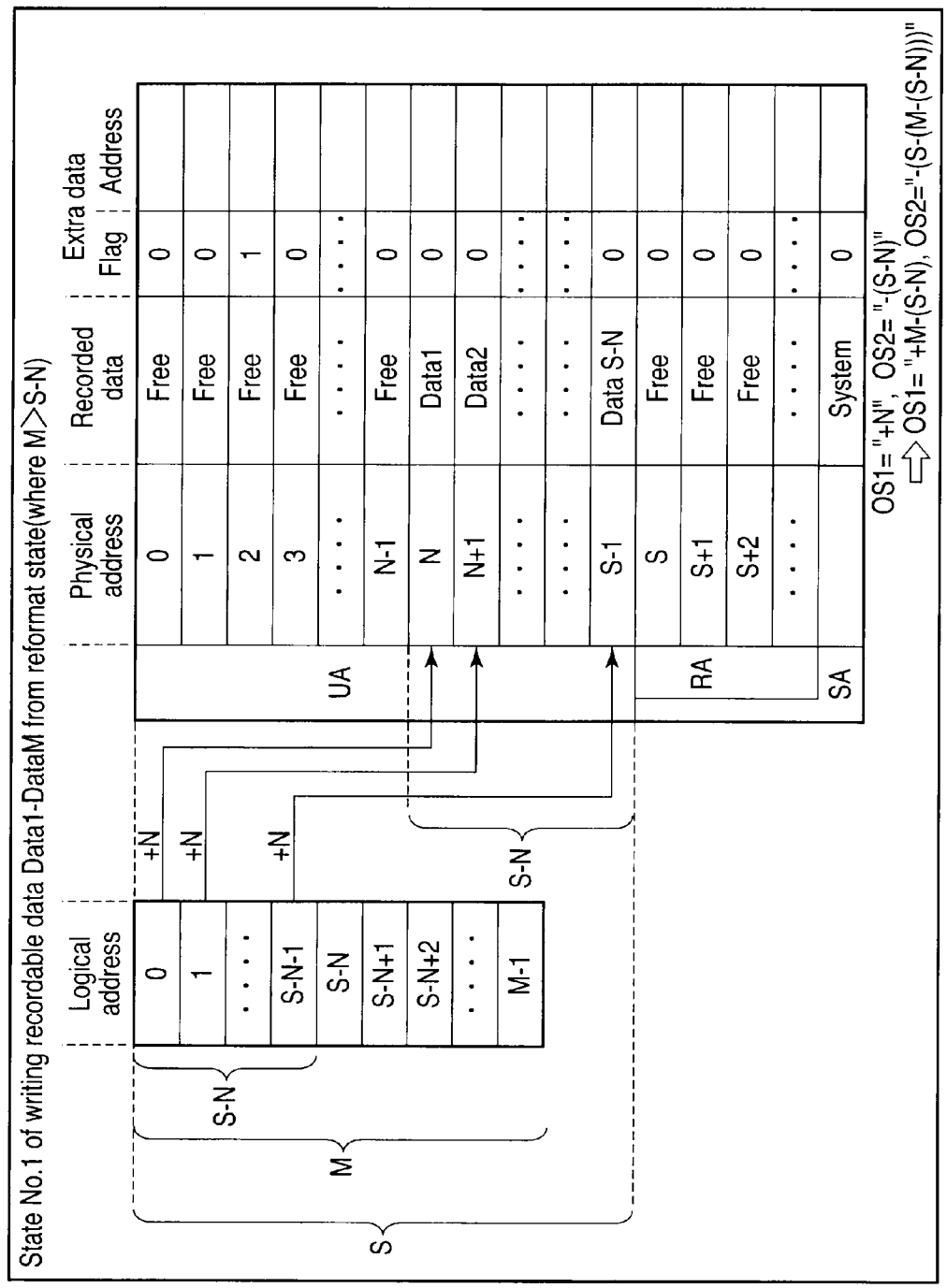
FIGS. 7 and 8 are views, each showing a writing operation in a reformat state.
Figure 8:
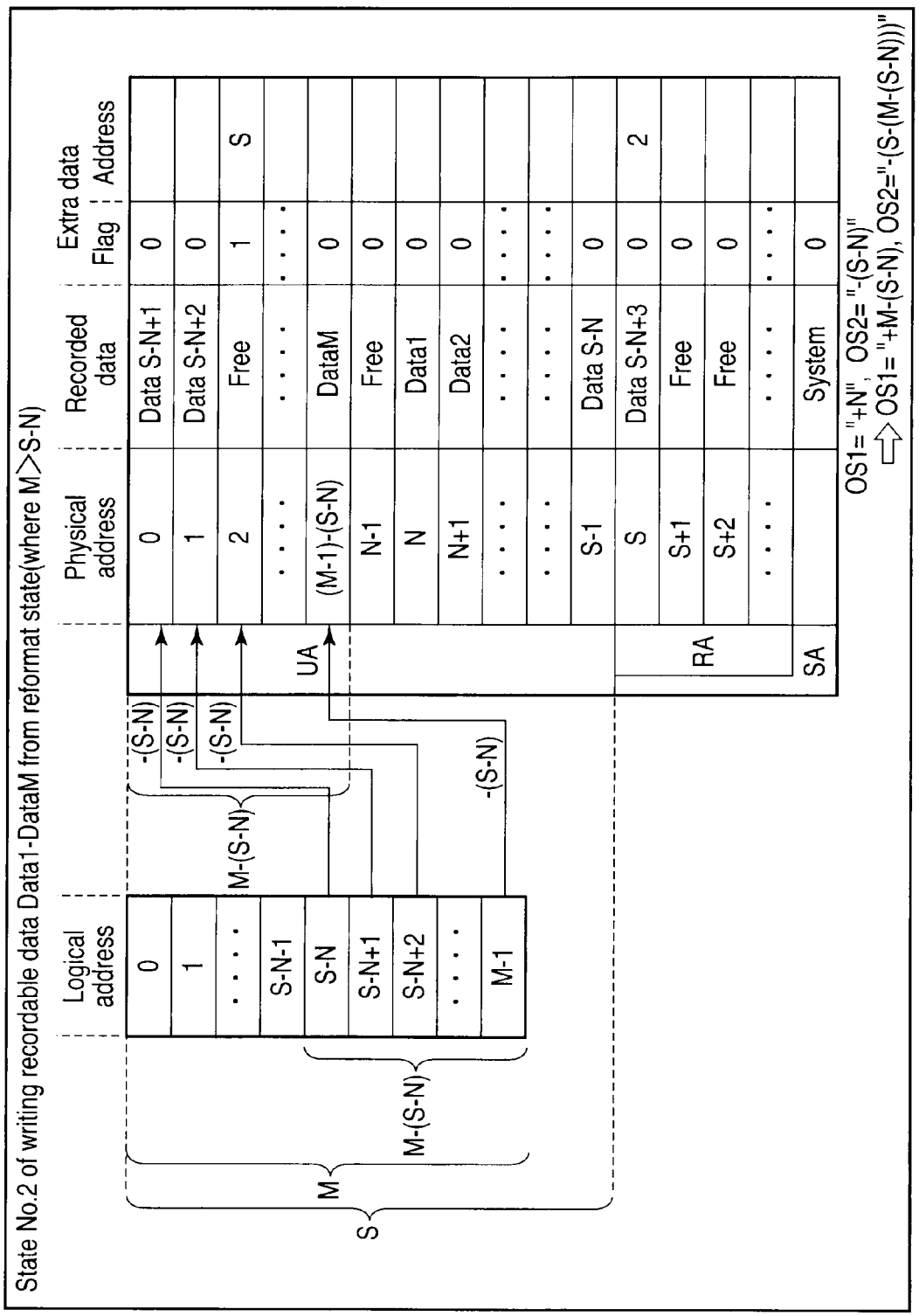

FIGS. 7 and 8 show a state of writing Data 1 to Data M from a reformat state.

In FIGS. 7 and 8, S, M and N are both a natural number, and have the relationship of M>S−N. N is the same as N shown in FIGS. 4 to 6.

For example, when data is written from a reformat state using a multi-block write command, a logical address is converted to a physical address by address mapping.

Specifically, concerning logical addresses 0 to S−N−1, data is written in a physical address adding "+N" to a logical address.

For example, in FIG. 7, Data 1 is recorded in the recorded data of the physical address N adding "+N" to logical address 0. Data 2 is recorded in the recorded data of the physical address N+1 adding "+N" to logical address 1.

Likewise, Data S−N is recorded in the recorded data of the physical address S−1 adding "+N" to logical address S−N−1.

Concerning logical addresses S−N to M−1, data is written in a physical address adding "−(S−N)" to a logical address.

For example, in FIG. 8, Data S−N+1 is recorded in the recorded data of the physical address 0 adding "−(S−N)" to logical address S−N. Data S−N+2 is recorded in the recorded data of the physical address 1 adding "−(S−N)" to logical address S−N+1.

In FIG. 8, an alternative flag of the physical address 2 is set to "1".

In this case, Data S−N+3 is written in a physical address S of the alternative area RA, and then, logical address 2 or data showing it is written in an alternative address of the physical address ("2" is simply shown in FIG. 8). A physical address S written with Data S−N+3 or data showing it is written in the alternative address of the physical address ("S" is simply shown in FIG. 8).

The information is used in a read operation.

Finally, Data M is recorded in the recorded data of the physical address (M−1)−(S−N) adding "−(S−N)" to logical address M−1.

As described above, the using physical address is rotated, and thereby, a memory is uniformly used. This serves to prevent generation of a bad block.

The second embodiment is effective for memory management of a recordable device. According to a system having different logical address and physical address, arbitrary address conversion is required; for this reason, a large conversion table is required. As a result, the features of recordable recording, that is, use of a serial address, are not utilized. According to error handling of the second embodiment, address conversion is made with respect to the portion only where an error occurs; therefore, a large address conversion table is dispensed with.

(4) Third Embodiment

The third embodiment is an application example of the second embodiment, and relates to an address conversion circuit for realizing the second embodiment.

Figure 9:
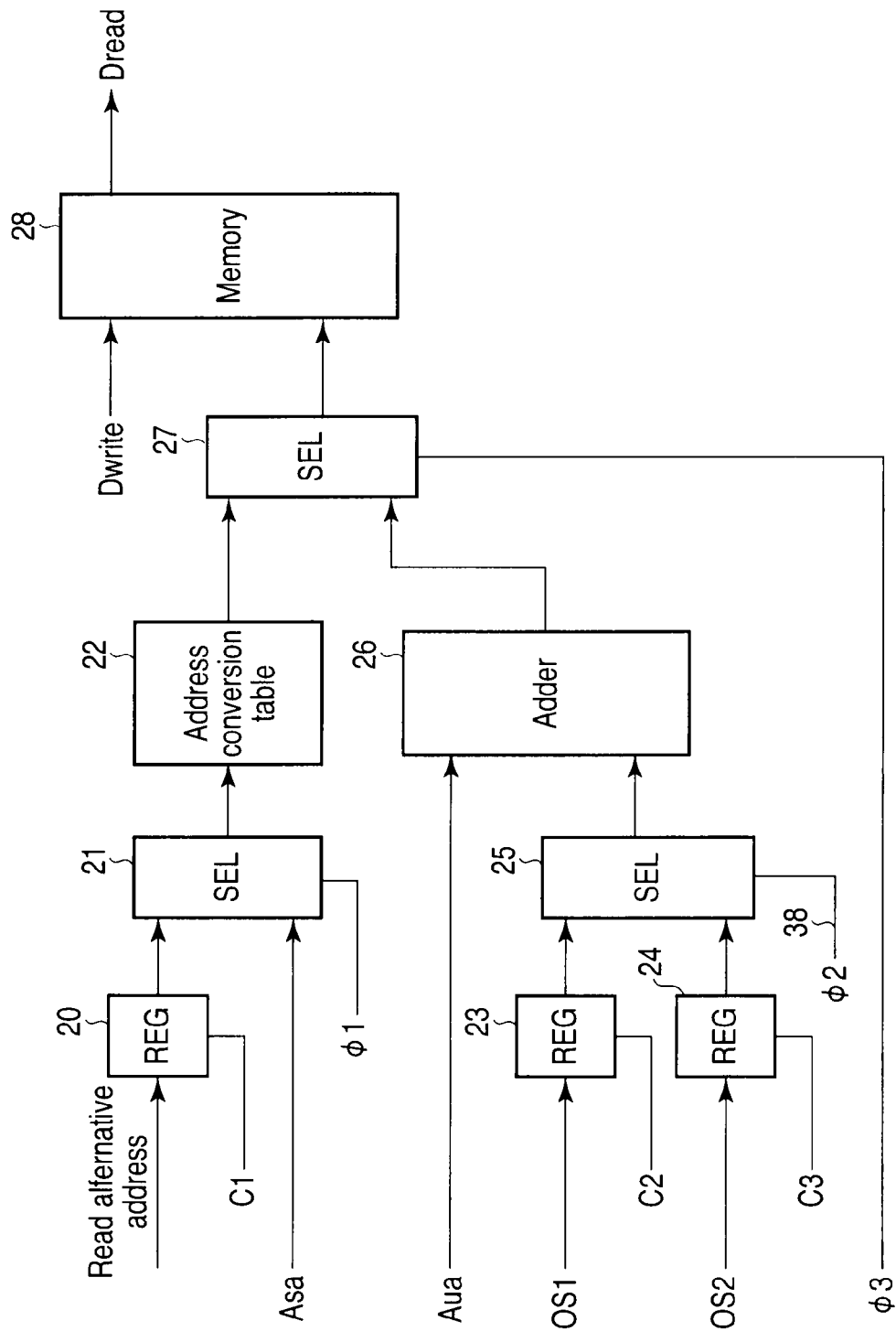
FIG. 9 is a view showing a configuration of an address conversion circuit.

FIG. 9 shows the configuration of an address conversion circuit for executing address mapping of FIG. 6.

In FIGS. 9, 20, 23 and 24 denote a register (REG), and 21, 25 and 27 denote a selector (SEL), and further, 22 denotes an address conversion table, 26 denotes an adder and 28 denotes a memory.

The operation of registers 20, 23 and 24 is controlled based on control signals C1, C2 and C3. A change of selectors 21, 25 and 27 is controlled based on control signals φ1, φ2 and φ3. Write data Dwrite is written in the memory 28 while read data Dread is read from the memory 28.

A system area address Asa is input to the selector 21, and a user area address Aua is input to the adder 26. An offset signal OS1 is input to the register 23, and an offset signal OS2 is input to the register 24.

If a write error occurs in the memory 28, a read alternative address is recorded in the register 20.

In the data writing operation of FIG. 5, OS1, OS2="0", for example, the OS1 is input to the adder 26 via the selector 25. In other words, in the initial format state, "0" is recorded in registers 23 and 24.

Therefore, the user area address (logical address) is intactly given as a physical address.

When a write error is detected in a write operation of Data 3, a read alternative address is recorded in the register 20. The read alternative address is converted to a physical address by the address conversion table 22, and thereafter, supplied to the memory 28 via the selector 27.

In the system area, there is the possibility that rewrite is executed in random. For this reason, substitution of an erase block and bad block handling are controlled by the address conversion table 22.

The foregoing write ends, and thereafter, OS1="+N" and OS2="−(S−N)" are set.

In a data writing operation, OS1="+N" and OS2="−(S−N)" are set, and then, OS1 is input to the adder 26 via the selector 25. In other words, in the reformat state, "+N" is recorded in the register 23 while "−(S−N)" is recorded in the register 24. In this case, the output "+N" only of the register 23 is transferred to the adder 26.

Therefore, a value adding "+N" to the user area address (logical address) is given as a physical address.

The foregoing write ends, and thereafter, OS1="+(N+M)" and OS2="−(S−N−M)" are set.

In a data writing operation of FIGS. 7 and 8, OS1="+N" and OS2="−(S−N)" are set. Concerning logical addresses 0 to S−N−1, OS1 is input to the adder 26 via the selector 25. Concerning logical addresses S−N to M−1, OS2 is input to the adder 26 via the selector 25.

Therefore, a value adding "+N" to the user area addresses (logical addresses) 0 to S−N−1 is given as a physical address. Moreover, a value adding "−(S−N)" to the user area addresses (logical addresses) S−N to M−1 is given as a physical address.

The foregoing write ends, and thereafter, OS1="+M−(S−N)" and OS2="−(S−(M−(S−N)))" are set.

(5) Association with File System

According to an aspect of the present invention, even if an error occurs in recordable recording, data transfer is efficiently performed without temporarily stopping data transfer. In addition, write is executed with respect to a serial address in the user area, and thereby, the address conversion table with respect to the user area is dispensed with. Further, the present invention is associated with a conventional file system.

For example, in FIG. 1, if an error is not recovered, the controller 4 gives notification showing the foregoing information to the host apparatus 1. When receiving the notification that an error is not recovered from the controller 4, the host apparatus 1 temporarily stops data transfer. Then, the host apparatus 1 determines an address starting retry using an error recoverable function of the file system.

When receiving the notification that an error is not recovered from the controller 4, the host apparatus 1 acquires write completed address information from the controller. Thereafter, the host apparatus 1 again retransmits write data from the address where the error occurred.

In this case, the host apparatus 1 can execute retry from the address where the error occurred; therefore, the retry operation is efficiently performed.

(6) Summary

As described in the first to third embodiments, temporary stoppage of data transfer in a write operation is prevented using the following functions. One is an address management function of a memory having a recordable characteristic. Another is a block data retransmission function when a CRC error occurs. Another is an error handling function by the controller of a memory device. Therefore, real-time recording of video data is realized without data lost.

3. Application Example

Preferably, the embodiments according to the present invention are applied to a recordable memory device formatted by a recordable file system.

A random access memory (RAM) has the following problem. Specifically, file fragmentation occurs during the use of the RAM; for this reason, write to a serial address is temporarily stopped.

In contrast, a recordable memory device can perform write to a serial address. The embodiments according to the present invention are applied to a recordable memory device, and thereby, write to a serial address, that is, data transfer is carried out without being temporarily stopped. Therefore, write control by the file system is simplified.

According to the foregoing advantage, for example, error handling by the file system is dispensed with.

According to the embodiments of the present invention, system overhead by interruption is reduced in data transfer by direct memory access (DMA) performing data writing using hardware. Therefore, the embodiments of the present invention are suitable for the use of real-time recording.

4. Conclusion

According to the embodiments of the present invention, real-time recording is possible at a stable write performance.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recordable memory device comprising:
a nonvolatile semiconductor memory; and
a controller configured to control the nonvolatile semiconductor memory,
wherein the nonvolatile semiconductor memory has a user area accessed from a host, and the user area is formatted by a file system which performs data writing in order of logical addresses,
data of the logical addresses are written in a reformatted user area of the nonvolatile semiconductor memory from a start point which is a physical address following the final physical address of data recorded in the user area before the reformat, and the data writing executes from a start point which is a top physical address of the user area, if a final physical address of the user area has been written.

2. The device according to claim 1, wherein the data writing executes from the top physical address in the user area, when new recorded data reaches the final physical address of the user area.

3. The device according to claim 1, wherein physical addresses corresponding to logical addresses 0 to (S−1) are obtained by adding "N" to the physical addresses in a range of logical addresses 0 to (S−N−1), and are obtained by subtracting "S−N" from the physical addresses in a range of logical addresses (S−N) to (S−1), where S is a memory size usable as the user area from the top of a memory space of the device, and N is a physical address at the start point.

4. The device according to claim 1, wherein the nonvolatile semiconductor memory has a system area, the system area includes an alternative area, the user area has an alternative flag in a redundancy section corresponding to an error address, the write data and a physical address of a location where an error occurs are written in a physical address of the alternative area, when a write error of write data occurs with respect to a specified physical address of the user area, and the alternative flag showing that an error occurs in the specified physical address is set active to inhibit the use of the specified physical address.

5. The device according to claim 4, wherein a physical address in the alternative area is stored in the redundancy section corresponding to the error address.

6. The device according to claim 4, wherein data of the alternative area in the user area and the system area is erased by the reformat, and the physical address in the alternative area and the alternative flag are reformatted.

7. The device according to claim 1, wherein the nonvolatile semiconductor memory is a NAND flash memory.

8. The device according to claim 1, wherein the controller performs an address mapping for rotating the physical address used in the user area.

9. The device according to claim 1, wherein the device is a memory card.

* * * * *